(12) United States Patent
Bi et al.

(10) Patent No.: US 8,946,952 B2
(45) Date of Patent: Feb. 3, 2015

(54) LOW PROFILE SPINDLE MOTOR

(75) Inventors: Chao Bi, Singapore (SG); Quan Jiang, Singapore (SG); Song Ling, Singapore (SG); Nay Lin Htun Aung, Singapore (SG); Hla Nu Phyu, Singapore (SG)

(73) Assignee: Agency for Science, Technology and Research, Siangapore (SG)

( * ) Notice: Subject to any disclaimer, the term of this patent is extended or adjusted under 35 U.S.C. 154(b) by 733 days.

(21) Appl. No.: 12/601,782

(22) PCT Filed: May 9, 2008

(86) PCT No.: PCT/SG2008/000175
§ 371 (c)(1),
(2), (4) Date: May 25, 2010

(87) PCT Pub. No.: WO2008/147329
PCT Pub. Date: Dec. 4, 2008

(65) Prior Publication Data
US 2010/0253170 A1    Oct. 7, 2010

(30) Foreign Application Priority Data

May 25, 2007    (SG) ................................ 200703782-3

(51) Int. Cl.
*H02K 1/27* (2006.01)
*H02K 1/14* (2006.01)
(Continued)

(52) U.S. Cl.
CPC .................. *H02K 1/148* (2013.01); *H02K 3/26* (2013.01); *H02K 21/16* (2013.01)
USPC ........................... 310/67 R; 310/112; 310/114

(58) Field of Classification Search
CPC ............................... H02K 1/148; H02K 21/16
USPC ........................................ 310/67 R, 112, 114
See application file for complete search history.

(56) References Cited

U.S. PATENT DOCUMENTS 4,837,474 A * 6/1989 Petersen et al. ......... 310/216.021
4,949,000 A * 8/1990 Petersen ....................... 310/179
(Continued)

FOREIGN PATENT DOCUMENTS

JP    62-122470    8/1987
JP    04-004733    1/1992
(Continued)

OTHER PUBLICATIONS

Written Opinion dated Nov. 19, 2010 citing references from Search Report by Intellectual Property Office of Singapore from related Singapore Application No. 200907798-3.
(Continued)

*Primary Examiner* — Alex W Mok
(74) *Attorney, Agent, or Firm* — Knobbe Martens Olson & Bear LLP

(57) ABSTRACT

A low profile spindle motor for supporting and rotating media disk or disks of a hard disk drive includes a plurality of stator teeth, a winding layer which may be formed by printed circuit board or the like, and a rotor. The plurality of stator teeth are disposed in an annular region surrounding an axis of rotation of the motor, and have projected ends for increasing the tooth area facing a magnet ring of the rotor. The winding layer has a plurality of windings disposed surrounding the axis of rotation. Each winding is coupled to one of the plurality of stator teeth. The magnet ring is positioned radially spaced apart and coplanar with the annular region. The magnet ring has magnetic poles annularly distributed to generate magnetic fluxes along radial direction. Spindle motor formed according to the invention has a low profile, improved performance and manufacturability.

34 Claims, 19 Drawing Sheets

(51) Int. Cl.
*H02K 3/26* (2006.01)
*H02K 21/16* (2006.01)

(56) References Cited

U.S. PATENT DOCUMENTS

| | | | | |
|---|---|---|---|---|
| 4,959,578 | A | * | 9/1990 | Varga .................... 310/268 |
| 5,107,159 | A | * | 4/1992 | Kordik ................ 310/156.44 |
| 5,296,981 | A | * | 3/1994 | Ogawa ................. 360/99.08 |
| 5,519,270 | A | * | 5/1996 | Yamada et al. ......... 310/67 R |
| 5,528,436 | A | * | 6/1996 | Peter ................... 360/99.08 |
| 5,726,829 | A | | 3/1998 | Bodmer et al. |
| 5,736,800 | A | * | 4/1998 | Iannello et al. ........... 310/90.5 |
| 5,742,450 | A | | 4/1998 | Moser |
| 5,798,583 | A | * | 8/1998 | Morita ................. 310/216.111 |
| 6,134,117 | A | * | 10/2000 | Funk et al. ............... 361/760 |
| 6,181,040 | B1 | * | 1/2001 | Schob .................... 310/90.5 |
| 6,594,111 | B1 | * | 7/2003 | Oveyssi et al. ........ 360/99.08 |
| 6,759,784 | B1 | | 7/2004 | Gustafson et al. |
| 6,950,276 | B2 | | 9/2005 | Fujita et al. |
| 2002/0113511 | A1 | * | 8/2002 | Daikoku et al. ........... 310/112 |
| 2004/0061396 | A1 | * | 4/2004 | Narita et al. ............. 310/112 |
| 2004/0145249 | A1 | * | 7/2004 | Brown ..................... 310/26 |
| 2005/0046311 | A1 | * | 3/2005 | Baumgartner et al. ..... 310/334 |
| 2005/0057112 | A1 | * | 3/2005 | Lopatinsky et al. ........ 310/208 |
| 2005/0093383 | A1 | * | 5/2005 | Wu et al. ................. 310/67 R |
| 2005/0194851 | A1 | * | 9/2005 | Eckert et al. .............. 310/71 |
| 2005/0258703 | A1 | * | 11/2005 | Kouda et al. ............. 310/180 |
| 2006/0279876 | A1 | | 12/2006 | Albrecht et al. |
| 2007/0040467 | A1 | | 2/2007 | Gu |

FOREIGN PATENT DOCUMENTS

| | | |
|---|---|---|
| JP | 04-076137 | 7/1992 |
| JP | 04-347568 | 12/1992 |
| JP | 2002-291214 | 10/2002 |

OTHER PUBLICATIONS

International Search Report and Written Opinion dated Jul. 18, 2009 for International Application No. PCT/SG2008/000175 filed May 9, 2008 (in 9 pages).

Notification of Reason for Rejection in Japanese Patent Application No. 2010-510267 mailed Jun. 5, 2013.

Decision for Final Rejection dispatched Mar. 5, 2014 in Japanese Patent Application 2010-510267.

* cited by examiner

LOW PROFILE SPINDLE MOTOR

TECHNICAL FIELD

The present invention relates to a permanent magnet synchronous spindle motor. In particular, it relates to a low profile spindle motor for use in data storage systems.

BACKGROUND OF THE INVENTION

Permanent magnet synchronous motor may be used in a data storage system such as a hard disk drive to support and rotate one or more media disks. With the applications of hard disk drives being extended from computer systems to consumer products, in particular portable electronic devices such as portable audio visual players and digital video cameras, etc, the physical dimension of hard disk drives in these applications are demanded to be small compared to those for computer systems, and hence low profile and miniature hard disk drives are developed to meet these requirements. In the meantime, the requirements for storage capacity, data accuracy and data access speed keep increasing. Hard disk drives designers and manufacturers are facing continuous challenges in developing hard disk drives to meet these requirements.

Difficulties have been arising in finding solutions to further reduce the physical dimension, in particular the thickness of hard disk drives, while maintaining or even improving the performance of hard disk drives. It is appreciated that one of the key factors which hinders thickness reduction of hard disk drives, lies in the stator structure of the spindle motor.

Presently, spindle motors are configured with stator windings wounded on stator teeth, and oriented along radial directions of the spindle motor. A relatively large space between adjacent windings must be reserved, in order for the winding tooling to operate and winds the winding turns on the stator teeth. The windings may also have to be designed with more turns, or thick wire with few turns, for meeting the requirements from motor drive system. However, more winding turns, or thick wire, will result in greater dimension of winding ends, which will affect the thickness reduction of the spindle motor.

What is needed is therefore a spindle motor for supporting and rotating media disk(s) of a hard disk drive, which has a structure and configuration to enable an improved manufacturability, reduced motor thickness while maintaining or even improving the performance.

SUMMARY OF INVENTION

Embodiments of the present invention provide stator and winding structures and configurations for low profile permanent magnetic synchronous spindle motor for hard disk drives.

According to one embodiment, there is provided a spindle motor in which the stator teeth and rotor magnet are radially and coplanarly disposed with respect to each other. A winding layer, such as that formed of a conductive layer of a Printed Circuit Board (PCB), a wiring layer of a wire-bonded substrate or the like, is provided, with its conductive layer forming stator windings in a plane or a two-dimensional area, and are axially oriented, i.e. with the winding center axis parallel to the axis of rotation of the spindle motor.

According to another embodiment, there is provided a spindle motor in which the stator teeth are disposed in an annular region surrounding an axis of rotation of the motor. A plurality of windings are provided, each being coupled to one of the plurality of stator teeth. Each winding has its winding axis oriented parallel to the axis of rotation. A rotor of the spindle motor has a magnet positioned radially spaced apart and being coplanar with the annular region. The magnet has magnetic poles annularly distributed to generate magnetic fluxes along radial direction of the magnet.

According to a further embodiment, a laminated stator ring is provided in a spindle motor. The laminated stator ring includes a first layer which forms the stator yoke, a dielectric substrate disposed on the first layer, and a conductive layer provided on the dielectric substrate. A plurality of windings are formed by the conductive layer. The laminated stator ring further includes a second layer which forms a plurality of stator teeth. Each of the stator teeth is coupled to one of the windings, with projected edges which increase the tooth area surrounding the permanent magnet ring.

Embodiments of the present invention provide axially orientated stator windings in a two dimensional region. A magnetic flux passage or loop is formed to pass radially from the rotor magnet, guided by the stator teeth along radial direction, guided by winding core along axial direction, and guided by stator yoke along circumferential direction. With the solutions provide by embodiment the present invention, spindle motors may be provided with improved motor performance and manufacturability and significantly reduced thickness.

Other aspects and advantages of the present invention will become apparent from the following detailed description, taken in conjunction with the accompanying drawings, illustrating by way of example the inventive concept of the present invention.

BRIEF DESCRIPTION OF THE DRAWINGS

These and other aspects and advantages of the present invention will be described in detail with reference to the accompanying drawings, in which.

DETAILED DESCRIPTION OF THE PREFERRED EMBODIMENTS

Figure 1:
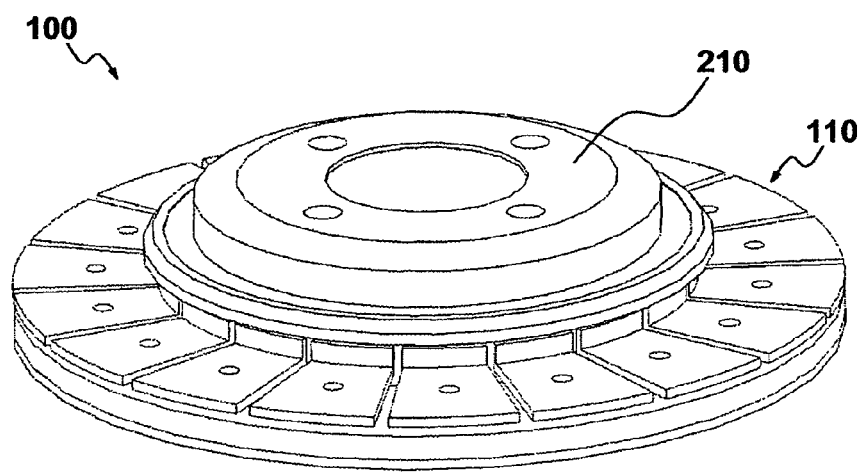
FIG. 1 is a perspective view of a spindle motor according to one embodiment of the present invention.
Figure 2:
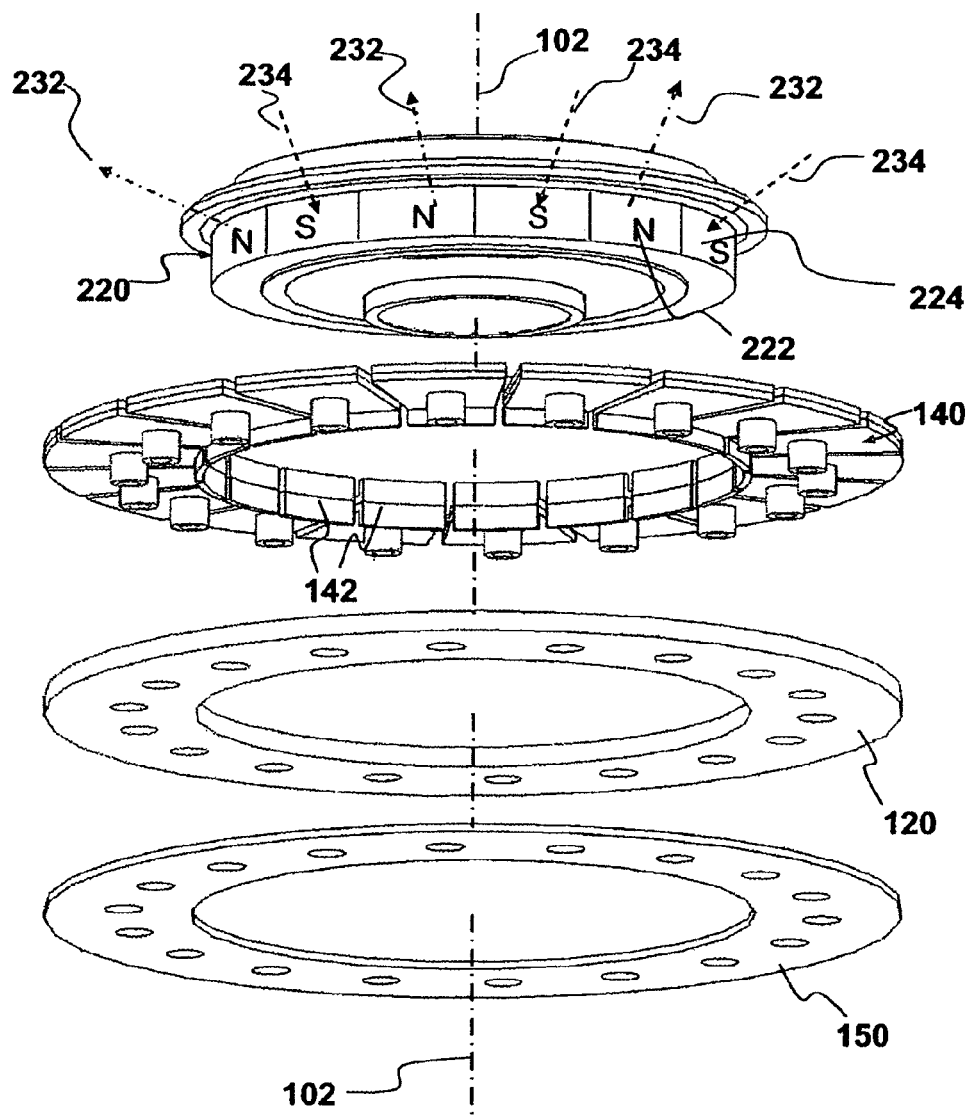
FIG. 2 is a exploded partial perspective view of FIG. 1.

As shown in FIGS. 1, 2, 3A and 3B, a spindle motor 100 according to one embodiment of the present invention includes a stator 110 and a rotor 210 with a generally ring-shaped permanent magnet 220 which is disposed radially inside stator 110 and rotatable relative to stator 110 about an axis of rotation 102 of spindle motor 100. Permanent magnet 220 has magnetic N and S poles 222, 224 configured to generate and receive magnetic fluxes 232, 234 along radial directions, i.e. perpendicular to axis of rotation 102 (FIG. 2).

Figure 3A:
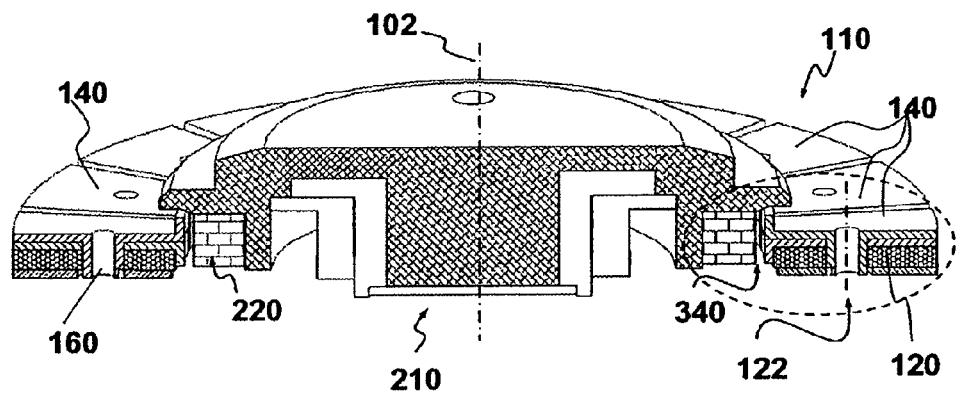
FIG. 3A is a cross sectional front view of FIG. 1.
Figure 3B:
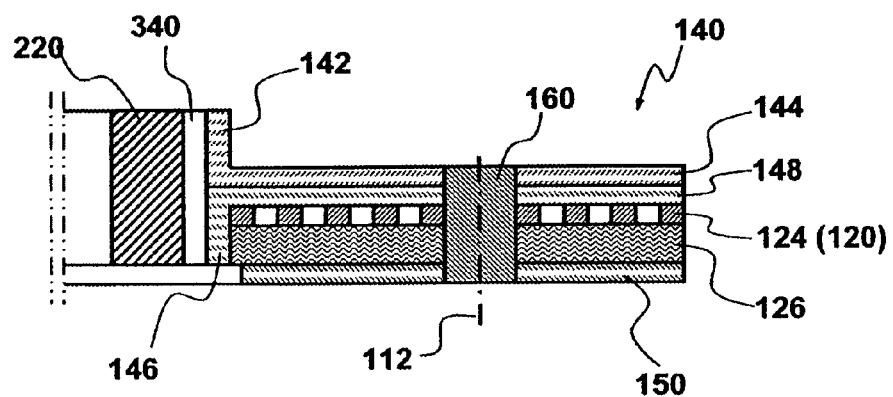
FIG. 3B is a partially enlarged view of FIG. 3A.

Stator 110 has a first set of windings 120, each being oriented with its winding axis 122 parallel to axis of rotation 102 (FIGS. 3A, 3B). Stator 110 further includes a plurality of stator teeth 140, and a stator yoke 150 positioned below stator teeth 140. The plurality of windings 120 is positioned between the set of stator teeth and stator yoke 150. A plurality of winding cores 160 are each placed between a corresponding stator tooth 140 and stator yoke 150, and passing through the center hollow portion of a corresponding winding 120. Each stator tooth 140 has a first end portion 142 adjacent to permanent magnet 220, forming an annular gap 340 therebetween. End portion 142 may be projected along a direction parallel to the axis of rotation 102, and with a height to accommodate the thickness of permanent magnet 220.

In the present embodiment, each of the stator teeth 140 is formed of a first layer 144 and a second layer 148. First and second layers 144 and 148 may be fabricated by, for example, stamping, and assembled together to form a stator tooth 140. The end portion 142 of first layer 144 may be bent or projected upwardly, and the end portion 146 of second layer 148 may be bent or projected downwardly. Bent or projected end portions 142 and 146 are dimensioned to accommodate the height of permanent magnet 220. An advantage of forming the stator teeth with end portions 142 and 146 facing the permanent magnet is that, the effective magnetic interaction area between the permanent magnet and the stator teeth can be increased compared to that formed by stator teeth without the end portions 142 and 146. The magnetic/mechanical energy conversion capability, and motor torque generation capability, can therefore be enhanced. In the meantime, the main area of stator teeth remains thin and this contributes to the reduction of overall thickness of the spindle motor.

In the present embodiment, windings 120 may be formed by conductive circuitries of a printed circuit board (PCB). As shown in FIG. 3B, the printed circuit board has a conductive layer 124 laminated on a dielectric substrate 126. Windings 120 are formed of spiral circuits from the conductive layer 124 by PCB fabrication technology. Once the desired windings 120 are formed on the conductive layer 124, the PCB may be sandwiched between stator teeth 140 and stator yoke 150 by, adhesion, soldering, pressing or the like, to form a laminated stator ring structure, as shown in FIG. 3B. In an alternative embodiment, windings 120 may be formed by bonding conductive wires on a substrate.

Figure 3C:
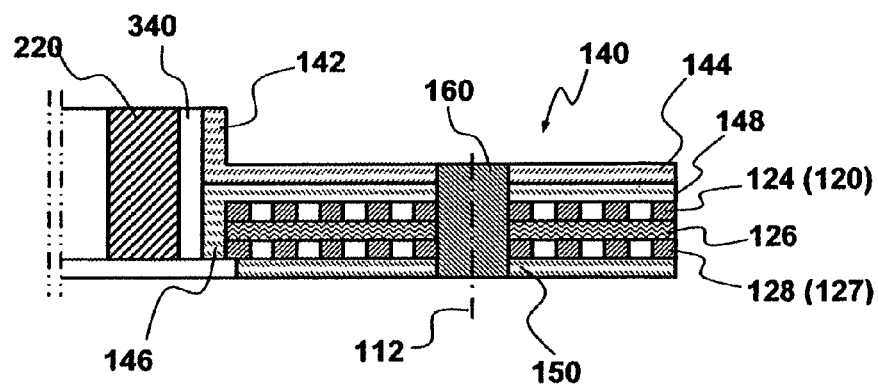
FIG. 3C is a cross sectional front view of a spindle motor according to another embodiment of the present invention

According to another embodiment, as shown in FIG. 3C, there may be a second set of windings 127 formed by a second conductive layer 128 of the PCB. The second set of windings 127 may be electrically coupled to the first set of windings 120. Depending on the requirements of the spindle motor, a multi-layer PCB may be provided, with three or more conductive layers, so as to form more sets of windings. Each set of the windings may connect with another set in series, or in parallel, to form the required multi phase armature windings of the motor.

Spindle motors configured according to embodiments of the present invention advantageously form planar and axially oriented stator windings. Manufacturing difficulties and limitations encountered in fabricating conventional spindle motor windings are successfully overcome. Because the windings are formed in a winding plane which is substantially a two dimensional area, the thickness of the windings are much reduced. Fabricating the windings from a PCB greatly improved the manufacturability, and increased the design freedom of the shape and patterns of the windings.

Figure 4:
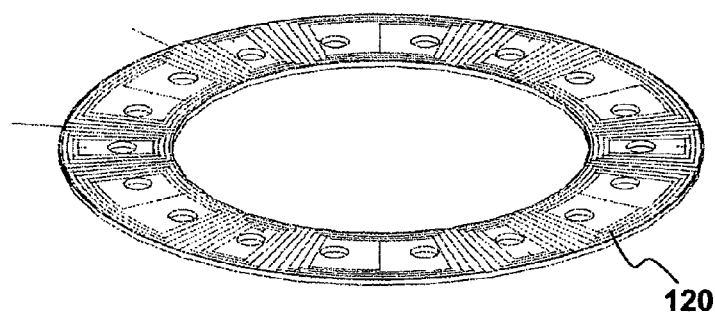
FIG. 4 is a perspective view showing an armature winding of a spindle motor shown in FIG. 1.

For example, the winding may be formed by surrounding one or two core regions, as shown in FIG. 4. Depending the design requirements, more than one layers of windings may also be formed in a stator assembly, which can be conveniently implemented by the multi layer PCB fabrication technology.

An added advantage is that, as the PCB may be laminated or adhered together with the stator teeth and stator yoke, both the strength and rigidity of the stator assembled is increased, which may also contribute to the overall performance improvement of the spindle motor.

Figure 5:
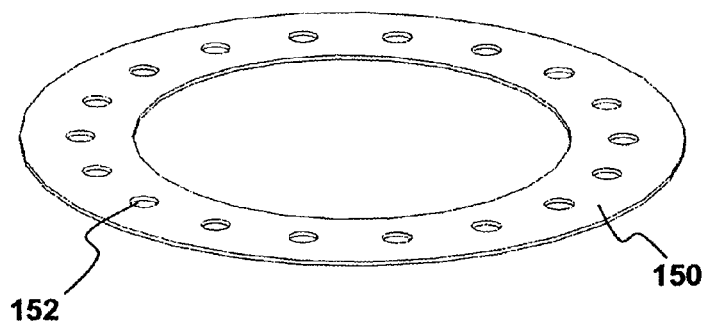
FIG. 5 is a perspective view showing a stator yoke of a spindle motor shown in FIG. 1.

As shown in FIG. 5, stator yoke 150 is formed of a single piece of magnetically permeable material, with openings such as holes or slots 152 formed thereon for coupling to winding cores 160.

Figure 6A:
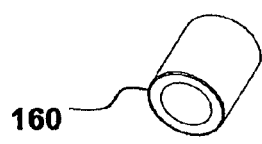
FIG. 6A is a perspective view showing a winding core of a spindle motor shown in FIG. 1.
Figure 6B:
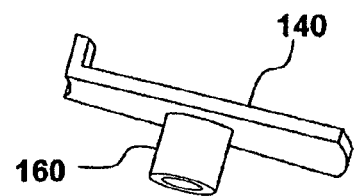
FIG. 6B is a perspective view of a stator tooth of a spindle motor shown in FIG. 1, with a winding core formed or assembled thereon.
Figure 6C:
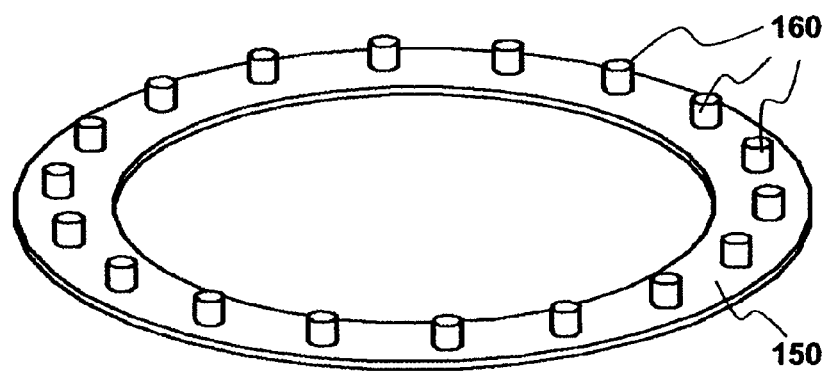
FIG. 6C is a perspective view showing winding cores connected to a stator yoke a spindle motor.

FIGS. 6A and 6B show winding core structures which may be adopted in the embodiment shown in FIG. 1. Winding core 160 may be cylindrical or circular segment shaped, and formed separately, as shown in FIG. 6A. Winding core 160 may be fabricated by forging, stamping, machining or metal injection molding, and assembled to a corresponding stator tooth 140. In the example shown in FIG. 6A, upon completion of the fabrication, the winding core 160 may be assembled to a stator tooth (not shown). Alternatively, each of the stator teeth 140 and a corresponding winding core may be formed of a single part (FIG. 6B) by, for example, injection molding or die casting. In an alternative embodiment, winding cores 160 may be formed integrately on, or connected to, stator yoke 150, as shown in FIG. 6C.

Stator teeth 140, winding core 160 and stator yoke 150 are made of ferrite magnetic material, and form a magnetic flux passage to allow magnetic flux generated by permanent magnet 210 to pass through and interact with stator windings.

Figure 7:
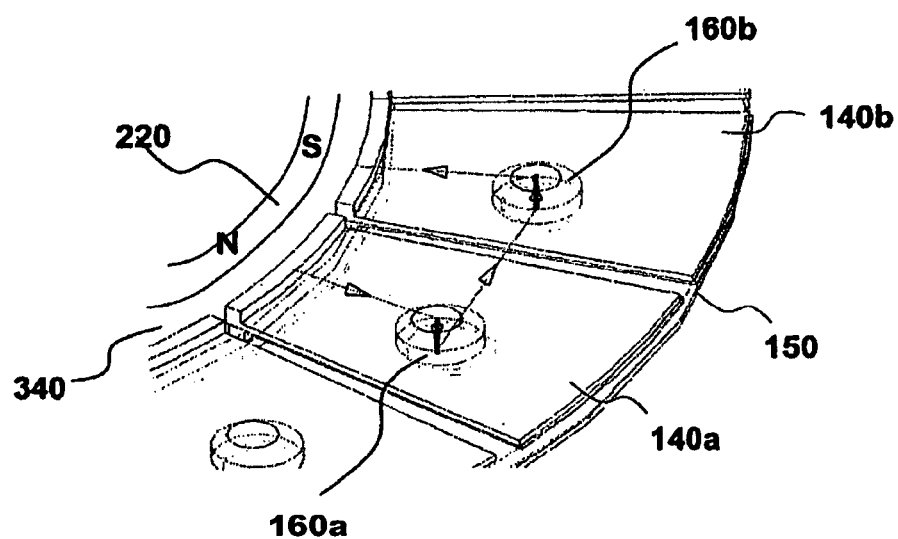
FIG. 7 is a perspective partial view of FIG. 3A showing magnetic flux passage.

Magnetic flux passage along adjacent stator teeth 140a and 140b are taken as an example for illustration, as shown following the passage route indicated by outlined arrows in FIG. 7.

A magnetic flux generated from an N pole of permanent magnet 220 passes across annular gap 340 along radial direction, and into a first stator tooth 140a. Guided by first winding core 160a, the magnetic flux turns downwardly along axial direction, and passes through first winding core 160a. When reaching stator yoke 150, the magnetic flux turns along circumferential direction, and further turns along axial direction upwardly upon reaching an adjacent winding core 160b. The magnetic flux is then guided by the adjacent stator tooth 140b, and turns radially back to an S pole of permanent magnet 220.

With a stator assembly configured as per the above illustrations, a spindle motor according to embodiments of the present invention achieved a low profile or thinner stator than conventional spindle motors. With stator windings axially orientated, the spacing reserved between stator windings for fabrication tooling necessary for conventional spindle motors is successfully eliminated. This allows for an increased winding density and winding space utilization, in a spindle motor, hence the power output of the spindle motor can be increased.

Figure 8:
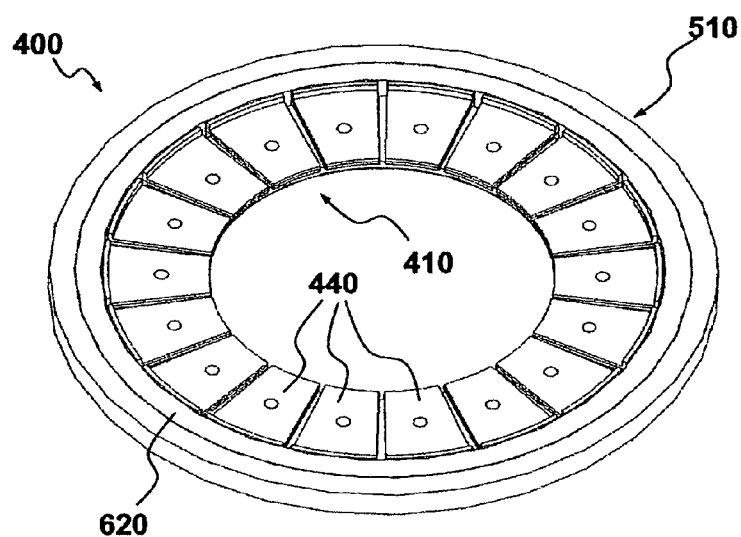
FIG. 8 is a perspective partial view of a spindle motor according to another embodiment of the present invention.

As shown in FIG. 8, a spindle motor 400 according to a further embodiment of the present invention includes a stator 410 and a rotor 510. Similar structures of stator teeth, axially-oriented windings and stator yoke are provided, which enable a spindle motor with much reduced thickness than that of the conventional spindle motors. The present embodiment varies from that shown in FIG. 1 in that, rotor 510 has a ring-shaped permanent magnet 620, and the stator 410 has a plurality of stator teeth 440 disposed inside the permanent magnet 620. A spindle motor with outer rotor configuration can thus be formed.

Figure 9:
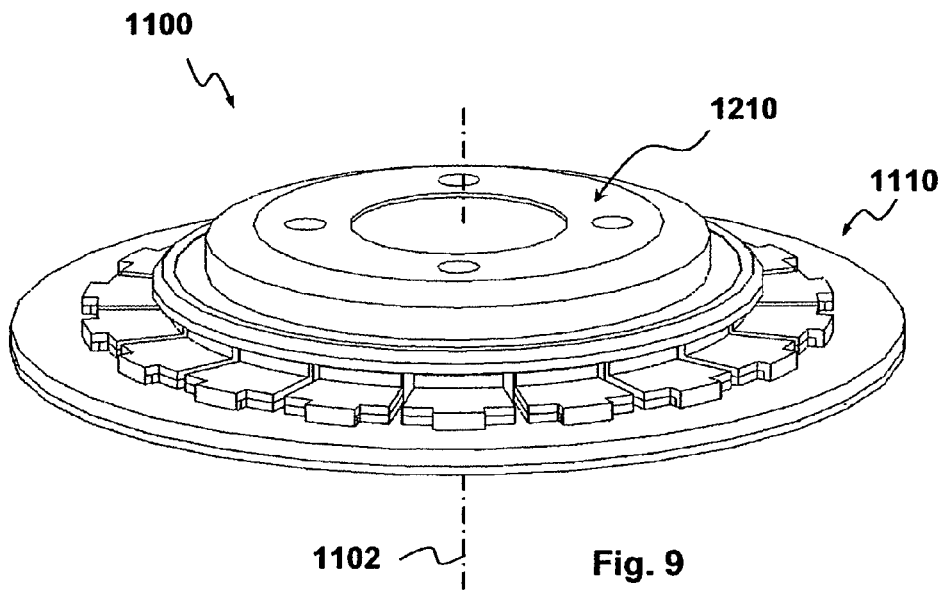
FIG. 9 is a perspective view of a spindle motor according to a further embodiment of the present invention.
Figure 10:
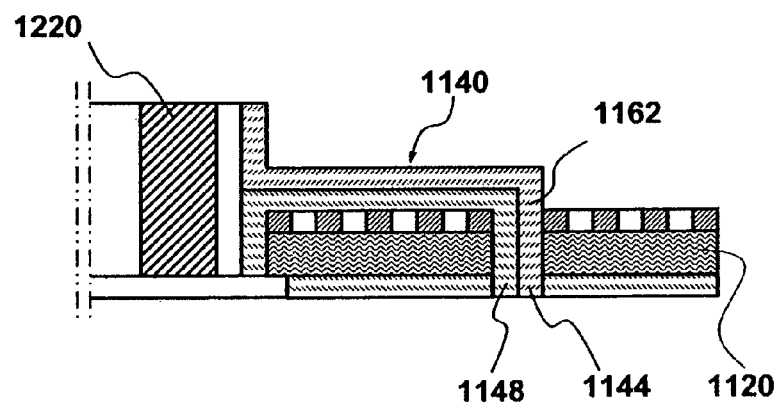
FIG. 10 is a partially enlarged cross sectional view of FIG. 9.
Figure 11A:
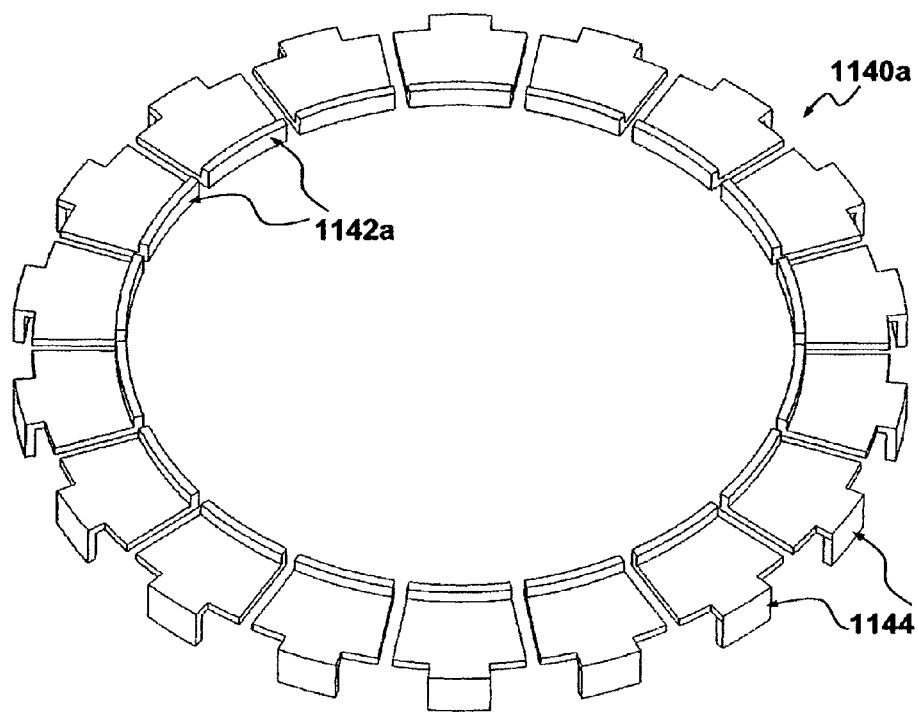
FIG. 11A is a perspective top view showing one exemplary single phase armature winding of a spindle motor shown in FIG. 9.
Figure 11B:
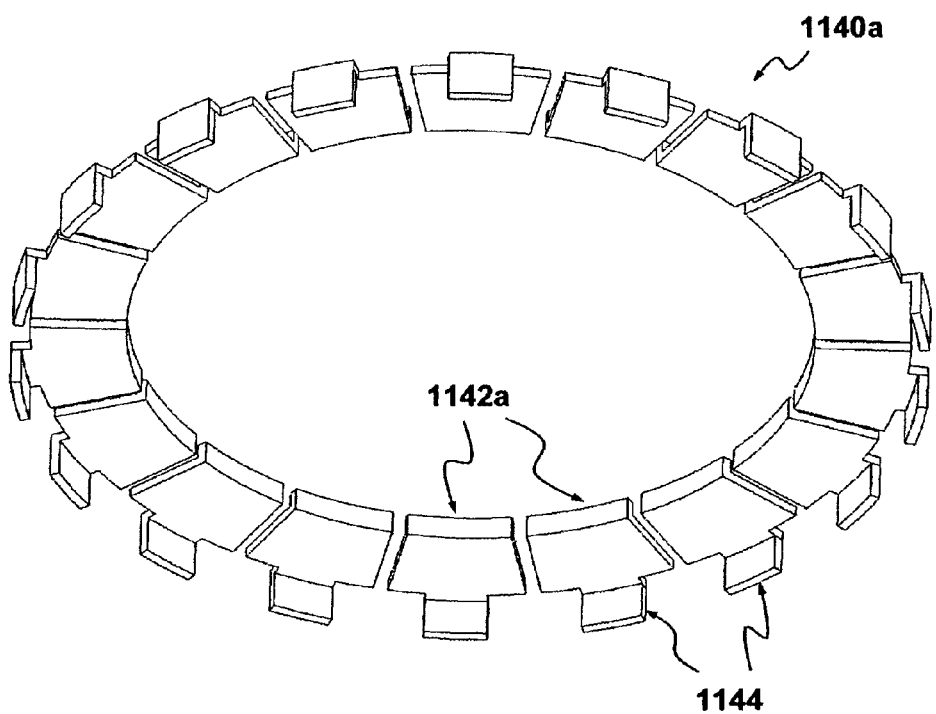
FIG. 11B is a perspective bottom view showing one exemplary single phase armature winding of a spindle motor shown in FIG. 9.
Figure 12A:
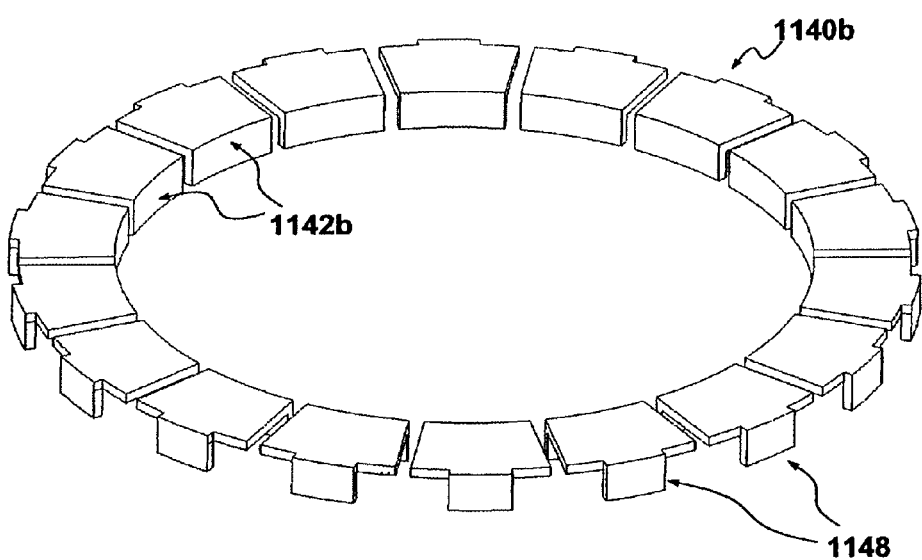
FIG. 12A is a perspective top view showing a stator yoke of a spindle motor shown in FIG. 9.
Figure 12B:
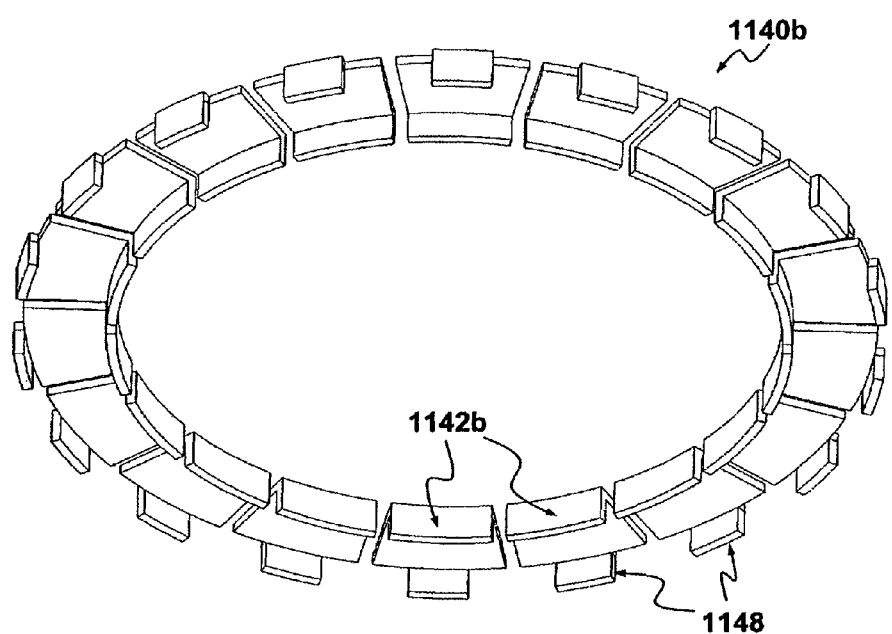
FIG. 12B is a perspective bottom view showing a stator yoke of a spindle motor shown in FIG. 9.

As shown in FIGS. 9, and 10, a spindle motor 1100 according to an alternative embodiment of the present invention includes a stator 1110 and a rotor 1210 with a generally ring-shaped permanent magnet 1220 which is disposed radially inside stator 1110 and rotatable relative to stator 1110 about an axis of rotation 1102 of spindle motor 1100.

The present embodiment varies from that shown in FIG. 1 in that, instead of providing winding cores of a cylindrical shape, formed separately and assembled onto a corresponding stator tooth, the outer end portion of each of the stator teeth 1140 may be bent downwardly along axial direction, forming a winding core portion 1162 which passes through windings 1120. An advantage of the present embodiment is that, the winding cores may be formed in one manufacturing process step during forming the stator parts 1144 and 1148 by, for example, stamping.

In the present embodiment, as shown in further detail in FIGS. 11A, 11B, 12A and 12B, each of the stator teeth 1140 is formed of an outer layer 1140a and inner layer 1140b. Outer and inner layers 1140a and 1140b may be fabricated by, for example, stamping, and assembled together to form a stator tooth 1140. The first end portion 1142 of outer layer 1140a may be bent or projected upwardly, and that of inner layer 1140b may be bent or projected downwardly. Bent or projected end portions 1142a and 1142b are dimensioned to accommodate the height of permanent magnet 1220. An advantage of forming the stator teeth with end portions 1142a and 1142b facing the permanent magnet is that, the effective magnetic interaction area between the permanent magnet and the stator teeth can be increased compared to that formed by stator teeth without the bent or projected end portions 1142a and 1142b. The magnetic/mechanical energy conversion capability, and motor torque generation capability, can therefore be enhanced. In the meantime, the main area of stator teeth remains thin and this contributes to the reduction of overall thickness of the spindle motor stator at the stator teeth body area. Bent or projected end portions 1144 and 1148 form winding cores 1162.

Figure 13:
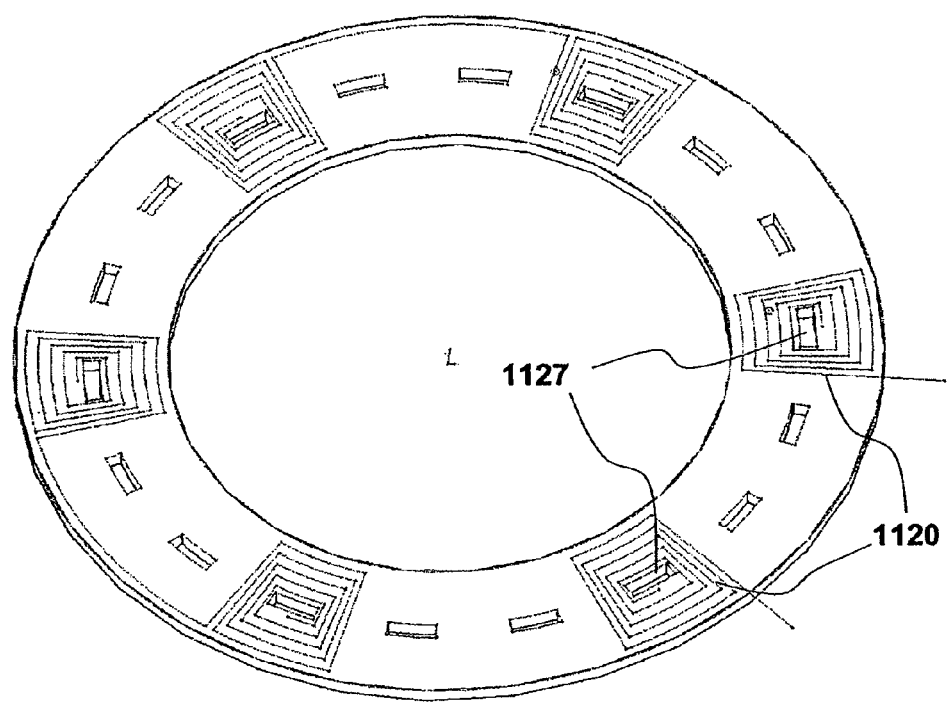
FIG. 13 is a perspective view showing the outer layer of stator teeth of a spindle motor shown in FIG. 9.

As shown in FIG. 13, the windings 1120 may be formed by surrounding one or more winding core holes 1127. Depending on the design requirements, more than one layers of windings may also be formed in a stator assembly, which can be conveniently implemented by the multi layer PCB fabrication technology.

An added advantage is that, as the PCB may be laminated or adhered together with the stator teeth and stator yoke, both the strength and rigidity of the stator assembled can be increased, which may also contribute to the overall performance improvement of the spindle motor.

Figure 14:
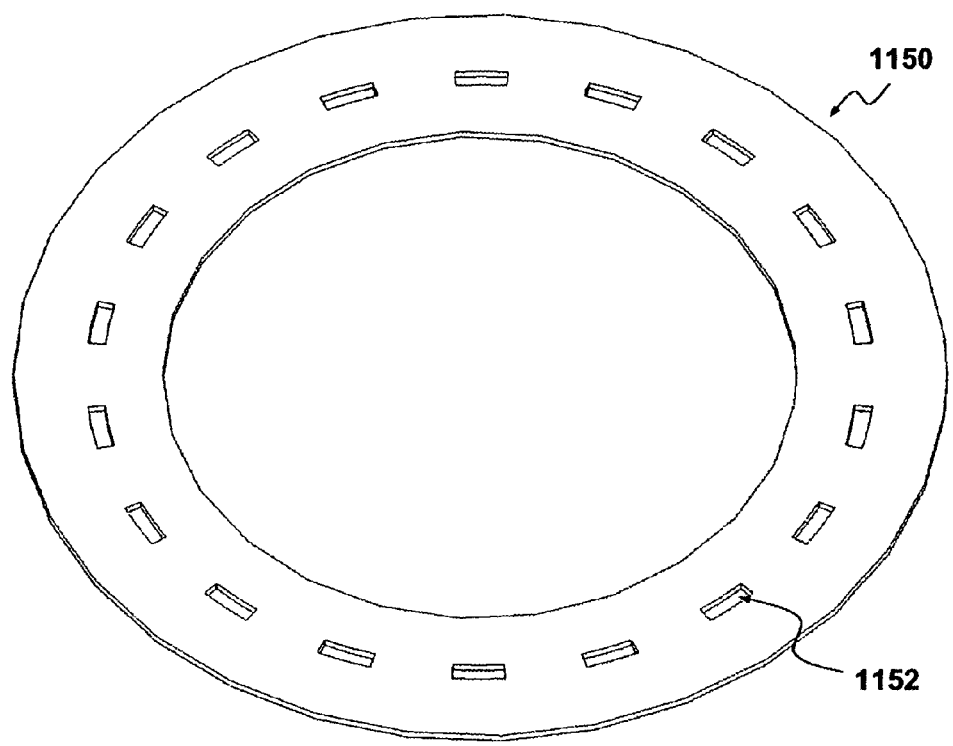
FIG. 14 is a perspective view showing the inner layer of stator teeth of a spindle motor shown in FIG. 9.

As shown in FIG. 14, stator yoke 1150 may be formed of a single piece of magnetically permeable material, with openings such as holes or slots 1152 formed thereon, each for coupling to a winding core 1162.

Stator teeth 1140 and stator yoke 1150 are made of ferrite magnetic material, and form a magnetic flux passage to allow magnetic flux generated by permanent magnet 1220 to pass through and interact with stator windings.

Figure 15:
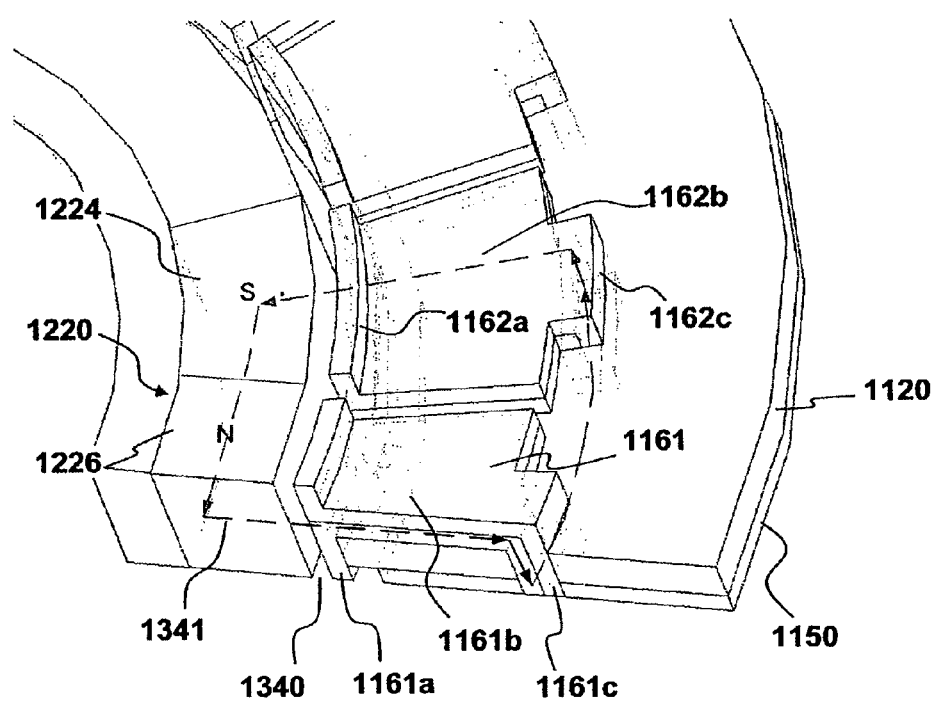
FIG. 15 is a perspective partial view of FIG. 9 showing magnetic flux passage.

Magnetic flux passage along adjacent stator teeth 1140a and 1140b are taken as an example for illustration, as shown following the passage route indicated by arrows in FIG. 15.

A magnetic flux generated from an N pole of permanent magnet 1220, depicted by line 1341 in FIG. 15, passes across annular gap 1340 along radial direction, and into a first stator tooth 1161 via bent or projected edge portion 1161a. Guided by the first tooth body 1161b, the magnetic flux turns downwardly along axial direction, and passes through the first tooth pin 1161c (which serves as a winding core). When reaching stator yoke 1150, the magnetic flux turns along circumferential direction, and further turns along axial direction upwardly upon reaching an adjacent tooth pin 1162c (which also serves as a winding core). The magnetic flux is then guided by the adjacent stator tooth body 1162b and edge portion 1162a, and turns radially back to an S pole of permanent magnet 1220.

With a stator assembly configured as per the above illustrations, a spindle motor according to embodiments of the present invention achieved a low profile or thinner stator than conventional spindle motors. With stator windings axially orientated, the spacing reserved between stator windings for fabrication tooling necessary for conventional spindle motors is successfully eliminated. This allows for an increased winding density and winding space utilization.

Providing the stator tooth with two layers, the center of permanent magnet ring can be configured higher than the winding layer. The two layers can also form the upwardly bent or projected edge 1142a and downwardly edge bent or projected 1142b, and these edge portions can increase the tooth surface area surrounding the magnet. Another benefit in using the two-layer stator tooth structure is that, the eddy current in the stator tooth body can be greatly reduced, and the core loss can also be greatly reduced.

Figure 16:
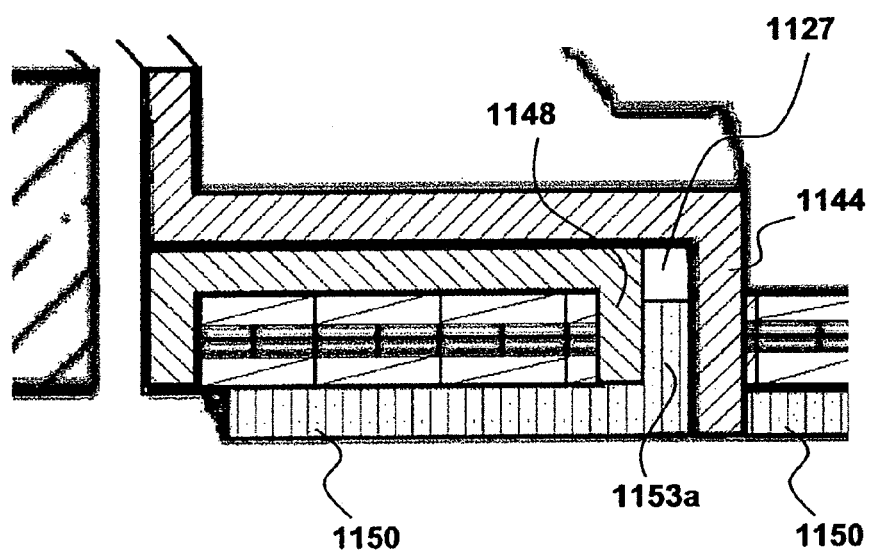
FIG. 16 is a partial cross sectional view showing a tooth pin configuration of a spindle motor according to another embodiment of the present invention.

FIG. 16 shows a yoke structure which may be adopted in the embodiment shown in FIG. 1 or FIG. 9. The yoke has a set of projections 1153a, each of which may be positioned in a corresponding hole 1127. The projections 1153a together with inner and outer stator tooth pin 1144 and 1148 form a winding core to allow magnetic flux to pass through. Projections 1153a can increase the contacting area between the yoke 1150 and the stator tooth 1140, therefore the magnetic flux is easier to pass through the stator tooth 1140 to yoke 1150. The projections 153a can also increase the mechanical strength of the stator.

Figure 17:
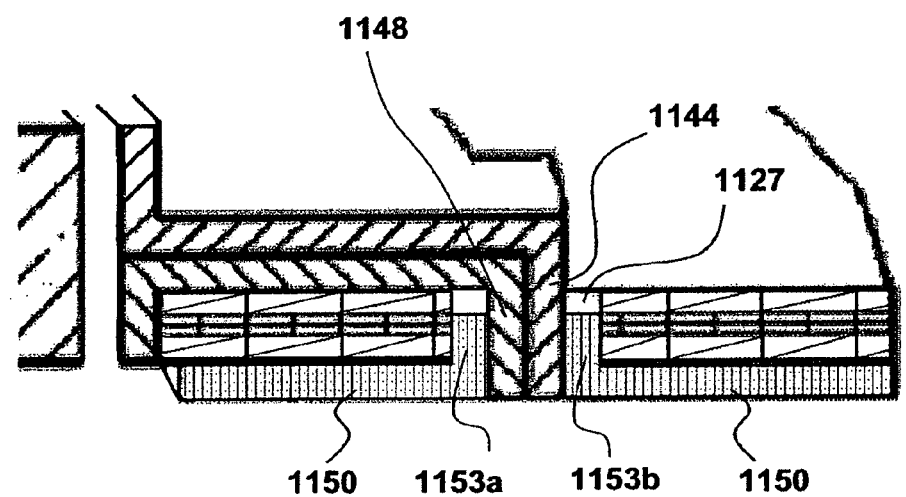
FIG. 17 is a partial cross sectional view showing a tooth pin configuration of a spindle motor according to yet another embodiment of the present invention.

FIG. 17 shows another yoke structure which may be adopted in the embodiment shown in FIG. 1 or FIG. 9. The yoke 1150 has first set of projections 1153a and second set of projections 1153b, forming a set of projection-pairs. Each projection-pair may be positioned in a hole 127. The projection-pairs 1153a, 1153b together with inner and outer stator tooth pine 1144 and 148 form a winding core to allow magnetic flux to pass through. These projection-pairs can further increase the contacting area between the yoke 1150 and the stator tooth 1140, therefore the magnetic flux is more easier to pass through the stator tooth 1140 to yoke 1150. The projections 1153a and 1153b can further increase the mechanical strength of the stator.

Figure 18:
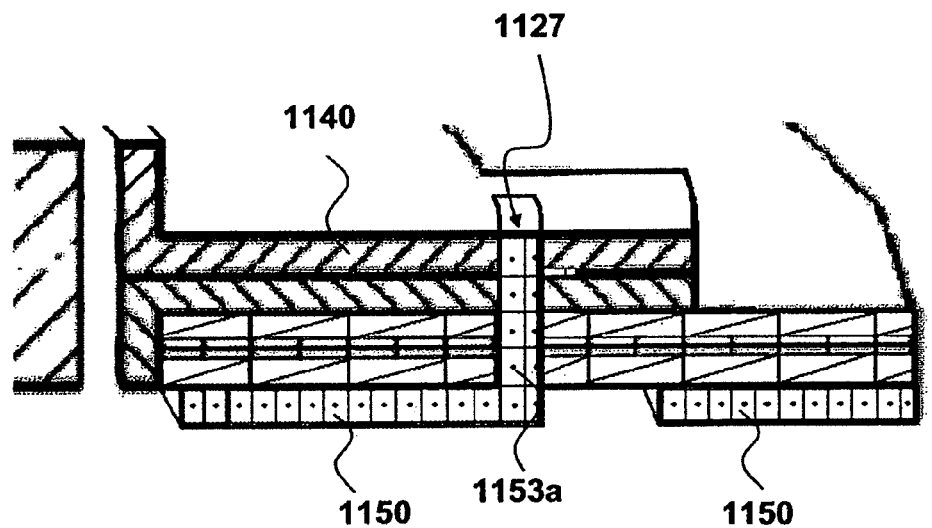
FIG. 18 is a partial cross sectional view showing a stator yoke pin configuration of a spindle motor according to still another embodiment of the present invention.

FIG. 18 shows another yoke structure which may be adopted in the embodiment shown in FIG. 1 or FIG. 9. The yoke 1150 has a set of projections 1153a, each of which may be positioned through a corresponding hole 1127, and to coupled to a corresponding stator tooth 1140 directly. Projections 1153a now form winding cores to allow magnetic flux to pass through. It would be appreciated according to this yoke structure, that some or all the stator teeth 1140 need not be formed with bent or projected ends for being positioned in the holes 1127.

Figure 19:
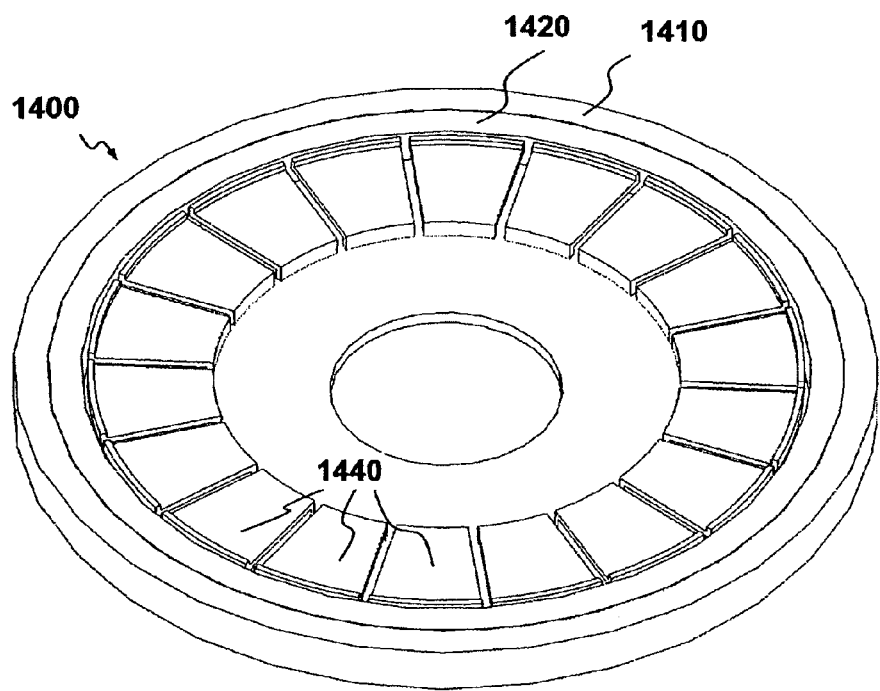
FIG. 19 is a perspective partial view of a spindle motor according to a further embodiment of the present invention.

As shown in FIG. 19, a spindle motor 1400 according to a further embodiment of the present invention includes a rotor yoke 1410 and permanent magnet 1420. Similar structures of stator teeth, axially-oriented windings and stator yoke are provided, which enable a spindle motor with much reduced thickness than that of the conventional spindle motors. The present embodiment varies from that shown in FIG. 9 in that, a plurality of teeth 1440 are disposed inside the permanent magnet 1420. A spindle motor with outer rotor configuration can thus be formed.

Although embodiments of the present invention have been illustrated in conjunction with the accompanying drawings and described in the foregoing detailed description, it should be appreciated that the invention is not limited to the embodiments disclosed, and is capable of numerous rearrangements, modifications, alternatives and substitutions without departing from the spirit of the invention as set forth and recited by the following claims.

The invention claimed is:

1. A spindle motor comprising:
   a plurality of stator teeth disposed in an annular region surrounding an axis of rotation of the motor;
   a plurality of winding cores, each of the plurality of winding cores being coupled to one of the plurality of stator teeth and extending from the one of the plurality of stator teeth in a direction substantially parallel to the axis of rotation of the motor;
   a winding layer positioned below the plurality of stator teeth, the winding layer having a plurality of windings, each of the plurality of windings surrounding one of the plurality of winding cores with an axis parallel to the axis of rotation of the motor;
   a rotor having a magnet positioned radially spaced apart and being coplanar with the annular region, the magnet having magnetic poles annularly distributed to generate magnetic fluxes along radial direction of the magnet;
   a stator yoke positioned below the plurality of stator teeth, the stator yoke being coupled to the plurality of winding cores and the plurality of stator teeth wherein the winding layer is sandwiched between the plurality of stator teeth and the stator yoke;
   wherein each of the plurality of stator teeth has a first end facing the magnet, the first end is projected along a direction parallel to the axis of rotation of the motor to accommodate an axial dimension of the magnet;
   wherein each of the plurality of stator teeth includes a first layer and a second layer laminated to the first layer, an end portion of the first layer is projected along a first axial direction, and an end portion of the second layer is projected along a second direction opposite to the first axial direction;
   wherein, for each of the plurality of stator teeth, an opposite end portion of the first layer and an opposite end portion of the second layer are bent along the second direction to define the winding core coupled to the stator tooth; and
   wherein the winding layer is formed of a conductive layer of a Printed Circuit Board or a wiring layer of a wire-bonded substrate.

2. The spindle motor of claim 1, wherein the plurality of stator teeth, the plurality of winding cores and the stator yoke form a magnetic flux passage to guide magnetic fluxes to pass from a magnetic pole of the magnet, one magnetic flux passes via a stator tooth along a first radial direction, through a winding core along an axial direction, through the stator yoke along a circumferential direction, through an adjacent winding core along an opposite axial direction, through an adjacent stator tooth along a second radial direction, and to an adjacent magnetic pole of the magnet.

3. The spindle motor of claim 1, wherein the magnet is disposed inside the annular region.

4. The spindle motor of claim 1, wherein the magnet is disposed outside the annular region.

5. The spindle motor of claim 1, further comprising a plurality of winding layers disposed parallel to each other, each winding layer having a plurality of windings disposed surrounding the axis of rotation of the motor.

6. A spindle motor comprising:
   a plurality of stator teeth disposed in an annular region surrounding an axis of rotation of the motor;
   a plurality of winding cores, each of the plurality of winding cores being coupled to one of the plurality of stator teeth and extending from the one of the plurality of stator teeth in a direction substantially parallel to the axis of rotation of the motor;
   a first set of windings positioned below the plurality of stator teeth, each of the first set of windings surrounding one of the plurality of winding cores with an axis parallel to the axis of rotation of the motor;
   a rotor having a magnet positioned radially spaced apart and being coplanar with the annular region, the magnet having magnetic poles annularly distributed to generate magnetic fluxes along radial direction of the magnet;
   a stator yoke positioned below the plurality of stator teeth, the stator yoke being coupled to the plurality of winding cores and the plurality of stator teeth wherein the first set of windings is sandwiched between the plurality of stator teeth and the stator yoke;
   wherein each of the plurality of stator teeth has a first end facing the magnet, the first end is projected along a direction parallel to the axis of rotation of the motor to accommodate an axial dimension of the magnet;
   wherein each of the plurality of stator teeth includes a first layer and a second layer laminated to the first layer, an end portion of the first layer is projected along a first axial direction, and an end portion of the second layer is projected along a second direction opposite to the first axial direction;

wherein, for each of the plurality of stator teeth, an opposite end portion of the first layer and an opposite end portion of the second layer are bent along the second direction to define the winding core coupled to the stator tooth; and
wherein the first set of windings are formed of a conductive layer of a Printed Circuit Board.

7. The spindle motor of claim 6, wherein the Printed Circuit Board further comprises a dielectric substrate laminated to the conductive layer at a first side of the dielectric substrate, wherein the dielectric substrate and the conductive layer are disposed between the plurality of stator teeth and the stator yoke.

8. The spindle motor of claim 7, further comprising a second set of windings, wherein each of the second set of windings has a winding axis oriented parallel to the axis of rotation of the motor and surrounding one of the plurality of winding cores, and wherein the second set of windings are formed of another conductive layer laminated to a second side of the dielectric substrate.

9. The spindle motor of claim 8, wherein the first and second sets of windings are connected in series to form a first type of multi phase stator winding structure.

10. The spindle motor of claim 8, wherein the first and second sets of windings are connected in parallel to form a second type of multi phase stator winding structure.

11. The spindle motor of claim 7, further comprising a plurality of conductive layers laminated to each other, each of the plurality of conductive layers forms a set of windings with each of the set of windings having a winding axis oriented parallel to the axis of rotation of the motor and surrounding one of the plurality winding cores.

12. The spindle motor of claim 6, wherein the plurality of stator teeth, the plurality of winding cores and the stator yoke form a magnetic flux passage to guide magnetic fluxes to pass from a magnetic pole of the magnet, one magnetic flux passes via a stator tooth along a first radial direction, through a winding core along an axial direction, through the stator yoke along a circumferential direction, through an adjacent winding core along an opposite axial direction, through an adjacent stator tooth along a second radial direction, and to an adjacent magnetic pole of the magnet.

13. The spindle motor of claim 6, wherein the magnet is disposed inside the annular region.

14. The spindle motor of claim 6, wherein the magnet is disposed outside the annular region.

15. A spindle motor having an axis of rotation, the spindle motor comprising:
a laminated stator ring including:
a first layer of magnetically permeable material forming a set of stator teeth;
a base layer of magnetically permeable material forming a stator yoke;
a plurality of winding cores, each of the plurality of winding cores being coupled to one of the stator teeth and extending from the one of the stator teeth in a direction substantially parallel to the axis of rotation of the motor wherein the base layer is positioned below the first layer and coupled to the plurality of winding cores and the stator teeth; and
a plurality of windings positioned below the first layer and sandwiched between the first layer and the base layer, each of the plurality of windings surrounding one of the plurality of winding cores with an axis parallel to the axis of rotation of the motor;
a rotor having a magnet positioned radially spaced apart and axially aligned with the stator ring about the axis of rotation of the motor, the magnet having magnetic poles annularly distributed to generate magnetic fluxes along radial direction of the magnet;
wherein each of the stator teeth has a first end facing the magnet, the first end is projected along a direction parallel to the axis of rotation of the motor to accommodate an axial dimension of the magnet;
wherein the spindle motor further comprises a second layer of magnetically permeable material forming the set of stator teeth wherein the second layer is disposed between the first layer and the plurality of windings, an end portion of the first layer of each of the stator teeth is projected along a first axial direction, and an end portion of the second layer of each of the stator teeth is projected along a second direction opposite to the first axial direction;
wherein, for each of the stator teeth, an opposite end portion of the first layer and an opposite end portion of the second layer are bent along the second direction to define the winding core coupled to the stator tooth; and
wherein the plurality of windings are formed of a conductive layer of a Printed Circuit Board.

16. The spindle motor of claim 15, wherein each of the plurality of winding cores being disposed through a corresponding winding and connected to a corresponding stator tooth and the base layer, and each of the plurality of winding cores is made of a magnetically permeable material.

17. The spindle motor of claim 16, wherein the set of stator teeth, the plurality of winding cores and the base layer form a magnetic flux passage to guide magnetic fluxes to pass from a magnetic pole of the magnet, one magnetic flux passes via a stator tooth along a first radial direction, through a winding core along an axial direction, through the first layer along a circumferential direction, through an adjacent winding core along an opposite axial direction, through an adjacent stator tooth along a second radial direction, and to an adjacent magnetic pole of the magnet.

18. The spindle motor of claim 15, wherein the magnet is disposed inside the stator region.

19. The spindle motor of claim 15, wherein the magnet is disposed outside the stator region.

20. A spindle motor comprising:
a plurality of stator teeth disposed in an annular region surrounding an axis of rotation of the motor;
a plurality of winding cores, each of the plurality of winding cores being coupled to one of the plurality of stator teeth and extending from the one of the plurality of stator teeth in a direction substantially parallel to the axis of rotation of the motor;
a winding layer positioned below the plurality of stator teeth, the winding layer having a plurality of windings, each of the plurality of windings surrounding one of the plurality of winding cores with an axis parallel to the axis of rotation of the motor;
a rotor having a magnet positioned radially spaced apart and being coplanar with the annular region, the magnet having magnetic poles annularly distributed to generate magnetic fluxes along radial direction of the magnet;
a stator yoke positioned below the plurality of stator teeth, the stator yoke being coupled to the plurality of winding cores and the plurality of stator teeth wherein the winding layer is sandwiched between the plurality of stator teeth and the stator yoke;
wherein each of the plurality of stator teeth has an end portion bent downwardly along a direction parallel to the axis of rotation of the motor to define the winding core coupled to the stator tooth; and wherein the winding layer is formed of a conductive layer of a Printed Circuit Board.

21. The spindle motor of claim 20, wherein the plurality of stator teeth, the plurality of winding cores and the stator yoke form a magnetic flux passage to guide magnetic fluxes to pass from a magnetic pole of the magnet, one magnetic flux passes via a stator tooth along a first radial direction, through a winding core along an axial direction, through the stator yoke along a circumferential direction, through an adjacent winding core along an opposite axial direction, through an adjacent stator tooth along a second radial direction, and to an adjacent magnetic pole of the magnet.

22. The spindle motor of claim 20, wherein the magnet is disposed inside the annular region.

23. The spindle motor of claim 20, wherein the magnet is disposed outside the annular region.

24. The spindle motor of claim 20, further comprising a plurality of winding layers disposed parallel to each other, each winding layer having a plurality of windings disposed surrounding the axis of rotation of the motor.

25. A spindle motor comprising:
a plurality of stator teeth disposed in an annular region surrounding an axis of rotation of the motor;
a plurality of winding cores, each of the plurality of winding cores being coupled to one of the plurality of stator teeth and extending from the one of the plurality of stator teeth in a direction substantially parallel to the axis of rotation of the motor;
a winding layer positioned below the plurality of stator teeth, the winding layer having a plurality of windings, each of the plurality of windings surrounding one of the plurality of winding cores with an axis parallel to the axis of rotation of the motor;
a rotor having a magnet positioned radially spaced apart and being coplanar with the annular region, the magnet having magnetic poles annularly distributed to generate magnetic fluxes along radial direction of the magnet;
a stator yoke positioned below the plurality of stator teeth, the stator yoke being coupled to the plurality of winding cores and the plurality of stator teeth wherein the winding layer is sandwiched between the plurality of stator teeth and the stator yoke;
wherein each of the plurality of stator teeth has an end portion bent downwardly along a direction parallel to the axis of rotation of the motor to define the winding core coupled to the stator tooth; and
wherein the winding layer is formed of a wiring layer of a wire-bonded substrate.

26. The spindle motor of claim 25, wherein the stator yoke is made of ferrite magnetic material.

27. The spindle motor of claim 25, wherein the plurality of stator teeth, the plurality of winding cores and the stator yoke form a magnetic flux passage to guide magnetic fluxes to pass from a magnetic pole of the magnet, one magnetic flux passes via a stator tooth along a first radial direction, through a winding core along an axial direction, through the stator yoke along a circumferential direction, through an adjacent winding core along an opposite axial direction, through an adjacent stator tooth along a second radial direction, and to an adjacent magnetic pole of the magnet.

28. The spindle motor of claim 25, wherein the magnet is disposed inside the annular region.

29. The spindle motor of claim 25, wherein the magnet is disposed outside the annular region.

30. The spindle motor of claim 25, further comprising a plurality of winding layers disposed parallel to each other, each winding layer having a plurality of windings surrounding the axis of rotation.

31. A spindle motor comprising:
a plurality of stator teeth disposed in an annular region surrounding an axis of rotation of the motor;
a plurality of winding cores, each of the plurality of winding cores being coupled to one of the plurality of stator teeth and extending from the one of the plurality of stator teeth in a direction substantially parallel to the axis of rotation of the motor;
a first set of windings positioned below the plurality of stator teeth, each of the first set of windings surrounding one of the plurality of winding cores with an axis parallel to the axis of rotation of the motor;
a rotor having a magnet positioned radially spaced apart and being coplanar with the annular region, the magnet having magnetic poles annularly distributed to generate magnetic fluxes along radial direction of the magnet;
a stator yoke positioned below the plurality of stator teeth, the stator yoke being coupled to the plurality of stator teeth and the plurality of winding cores, wherein the first set of windings is disposed between the plurality of stator teeth and the stator yoke;
wherein each of the plurality of stator teeth has an end portion bent downwardly along a direction parallel to the axis of rotation of the motor to define the winding core coupled to the stator tooth; and
wherein each of the first set of windings is distributed within a first winding layer;
wherein the spindle motor further comprises a dielectric substrate laminated to the first winding layer at a first side of the dielectric substrate, wherein the dielectric substrate and the first winding layer are disposed between the plurality of stator teeth and the stator yoke;
wherein the first winding layer and the dielectric substrate are formed of a Printed Circuit Board; and
wherein the first winding layer is formed of a conductive layer of the Printed Circuit Board.

32. The spindle motor of claim 31, wherein the plurality of stator teeth, the plurality of winding cores and the stator yoke form a magnetic flux passage to guide magnetic fluxes to pass from a magnetic pole of the magnet, one magnetic flux passes via a stator tooth along a first radial direction, through a winding core along an axial direction, through the stator yoke along a circumferential direction, through an adjacent winding core along an opposite axial direction, through an adjacent stator tooth along a second radial direction, and to an adjacent magnetic pole of the magnet.

33. The spindle motor of claim 31, wherein the magnet is disposed inside the annular region.

34. The spindle motor of claim 31, wherein the magnet is disposed outside the annular region.

* * * * *